US007508832B2

(12) United States Patent
Romana et al.

(10) Patent No.: US 7,508,832 B2
(45) Date of Patent: *Mar. 24, 2009

(54) METHOD AND SYSTEM FOR PROVIDING BROADCAST CHANNELS OVER AN EMULATED SUBNETWORK

(75) Inventors: Mario Romana, River Vale, NJ (US); Michael P. Bottiglieri, River Vale, NJ (US); Shilin Wang, Morristown, NJ (US); Chemin Hsieh, Ramsey, NJ (US); Frank Schumeg, Ogdensburg, NJ (US)

(73) Assignee: Fujitsu Limited, Kawasaki (JP)

( * ) Notice: Subject to any disclaimer, the term of this patent is extended or adjusted under 35 U.S.C. 154(b) by 825 days.

This patent is subject to a terminal disclaimer.

(21) Appl. No.: 10/926,460

(22) Filed: Aug. 25, 2004

(65) Prior Publication Data

US 2005/0026638 A1    Feb. 3, 2005

Related U.S. Application Data

(63) Continuation of application No. 09/325,696, filed on Jun. 3, 1999, now Pat. No. 6,785,285.

(51) Int. Cl.
 *H04L 12/56* (2006.01)
(52) U.S. Cl. .............................. 370/395.51; 370/395.65; 370/397; 370/404
(58) Field of Classification Search .................. None
 See application file for complete search history.

(56) References Cited

U.S. PATENT DOCUMENTS

| 4,893,306 A | 1/1990 | Chao et al. ................. 370/94.2 |
| 5,012,469 A | 4/1991 | Sardana ..................... 370/95.3 |
| 5,130,984 A | 7/1992 | Cisneros .................... 370/94.1 |

(Continued)

FOREIGN PATENT DOCUMENTS

EP    0 509 648 A1    10/1992

(Continued)

OTHER PUBLICATIONS

Wu, et al., "A Broadband Virtual Path SONET/ATM Self-Healing Ring Architecture and Its Economic Feasibility Study," *IEEE Global Telecommunications Conference*, Dec. 6-9, 1992, 8 pages.

(Continued)

*Primary Examiner*—Wing F Chan
*Assistant Examiner*—Brian Roberts
(74) *Attorney, Agent, or Firm*—Baker Botts L.L.P.

(57) ABSTRACT

A method and system for communicating traffic on an emulated subnetwork of a telecommunications ring having a plurality of nodes interconnected by a transmission media includes obtaining traffic at a node on the telecommunications ring. The traffic is segmented into a plurality of discrete segments. A set of broadcast cells is generated by adding an address header to each segment. The address header identifies a virtual channel dedicated to the node on the subnetwork in the telecommunications ring. The set of broadcast cells are transmitted in the virtual channel of the subnetwork and within a frame of the telecommunications ring. At each remaining node on the telecommunications ring, in response to receiving the set of broadcast cells in the virtual channel, both retransmitting and processing the broadcast cells.

17 Claims, 5 Drawing Sheets

U.S. PATENT DOCUMENTS

| | | | |
|---|---|---|---|
| 5,204,882 A | 4/1993 | Chao et al. | 375/106 |
| 5,278,833 A | 1/1994 | Crisler et al. | 370/95.1 |
| 5,295,140 A | 3/1994 | Crisler et al. | 370/94.1 |
| 5,303,234 A | 4/1994 | Kou | 370/85.2 |
| 5,515,376 A | 5/1996 | Murthy et al. | 370/85.13 |
| 5,537,403 A | 7/1996 | Cloonan et al. | 370/60.1 |
| 5,677,905 A | 10/1997 | Bigham et al. | 370/94.2 |
| 5,689,506 A | 11/1997 | Chiussi et al. | 370/388 |
| 5,712,851 A | 1/1998 | Nguyen et al. | 370/399 |
| 5,724,358 A * | 3/1998 | Headrick et al. | 370/418 |
| 5,771,234 A | 6/1998 | Wu et al. | 370/396 |
| 5,796,720 A | 8/1998 | Yoshida et al. | 370/245 |
| 5,805,568 A | 9/1998 | Shinbashi | 370/223 |
| 5,812,525 A | 9/1998 | Tareslinna | 370/229 |
| 5,841,771 A | 11/1998 | Irwin et al. | 370/360 |
| 5,867,502 A | 2/1999 | Chang | 370/477 |
| 5,920,412 A | 7/1999 | Chang | 359/128 |
| 5,949,755 A * | 9/1999 | Uphadya et al. | 370/224 |
| 5,982,776 A | 11/1999 | Manning et al. | 370/414 |
| 6,144,669 A | 11/2000 | Williams et al. | 370/401 |
| 6,160,793 A | 12/2000 | Ghani et al. | 370/236 |
| 6,198,744 B1 | 3/2001 | Huggins et al. | 370/395 |
| 6,198,754 B1 | 3/2001 | Nakayama | 370/536 |
| 6,301,254 B1 | 10/2001 | Chan et al. | 370/397 |
| 6,466,577 B1 | 10/2002 | Humblet et al. | 370/395.3 |
| 6,603,739 B1 | 8/2003 | Dubuc | 370/232 |
| 6,785,285 B1 * | 8/2004 | Romana et al. | 370/395.51 |

FOREIGN PATENT DOCUMENTS

| | | |
|---|---|---|
| EP | 0 680 235 A1 | 11/1995 |
| EP | 0 700 186 A1 | 3/1996 |
| EP | 0 817 439 A2 | 1/1998 |
| EP | 0 818 940 A2 | 1/1998 |
| EP | 0 868 058 A1 | 9/1998 |
| EP | 0 901 307 A2 | 3/1999 |
| WO | WO 99/09689 | 2/1999 |

OTHER PUBLICATIONS

Tsong-Ho Wu, "Cost-Effective Network Evolution, A three-phase path from todays SONET/STM ring transport to a SONET/ATM VP ring transport could facilitate the network evolution for broadband service," *IEEE Communications Magazine,* Sep. 1993, 10 pages.

M.Huterer, "ATM on SDH," *Alcatel Telecommunications Review,* 1st Quarter, 1997, 9 pages.

Tai H. Noh, ATM Scenarios for SDH/SONET Networks, XP-000750438, *Bell Labs Technical Journal,* Jan.-Mar. 1998, 13 pages.

International Search Report in International Application No. PCT/US 00/15426, dated Sep. 21, 2000, 7 pages.

Kurimoto, et al., "An Expandable Multicast ATM Switch Based on Copy Trunk with New Delay Control and Cell Spacing Functions, XP 000628644, "*IEICE Trans. Commun.*, vol. E79B, No. 8, Aug. 1996, 7 pages.

Subramaniam, et al., Multicasting in ATM networks using MINs[1], *Computer Communications 19,* 1996, 11 pages.

K. Sriram, "Methodologies for bandwidth allocation, transmission scheduling, and congestion avoidance in broadband ATM networks," *Computer Networks and ISDN Systems,* vol. 26, No. 1, Sep. 1993, 17 pages.

Fabrice Guillemin, et al., "Some Traffic Aspects in Virtual Private Networks over ATM," XP-000702583, Source Unknown, Apr. 1996, 12 pages.

Noriharu Miyaho, et al., "Integrated Switching Architecture and Its Traffic Handling Capacity in Data Communication Networks," XP 000692355, *IEEE Trans Commun.,* vol. E79-B, No. 12, Dec. 1996, 13 pages.

"General Aspects of Digital Transmission Systems," XP-002083788, ITU-T Recommendation G.708, *ITU-T Telecommunication Standardization Section of ITU,* Mar. 1993, 19 pages.

* cited by examiner

METHOD AND SYSTEM FOR PROVIDING BROADCAST CHANNELS OVER AN EMULATED SUBNETWORK

CROSS-REFERENCE TO RELATED APPLICATION

This application is a Continuation of U.S. application Ser. No. 09/325,696 filed Jun. 3, 1999, entitled Method and System for Providing Broadcast Channels over an Emulated Subnetwork, now issued as U.S. Pat. No. 6,785,285 on Aug. 31, 2004.

TECHNICAL FIELD OF THE INVENTION

This invention relates generally to the field of telecommunications, and more particularly to a method and system for providing broadcast channels over an emulated subnetwork on a UPSR SONET ring.

BACKGROUND OF THE INVENTION

Telecommunications systems include customer premise equipment (CPE), local loops connecting each customer premises to a central office or other node, the nodes providing switching and signaling for the system, and internode trunks connecting the various nodes. The customer premise equipment (CPE) includes telephones, modems for communicating data over phone lines, and computer and other devices that can directly communicate video, audio, and other data over a data link. The network nodes include traditional circuit-switched nodes that have transmission paths dedicated to specific users for the duration of a call and employ continuous, fixed bandwidth transmission and packet-switch nodes that allow dynamic bandwidths, dependent on the application. The transmission media between nodes may be wireline or wireless.

One type of wireline transmission media is optical fiber which is a thin strand of glass that is designed to carry information using pulses of light. Separate optical fibers are bundled together and encased in an outer sheath to form fiber cables. Optical fiber provides users with higher reliability, superior performance, and greater flexibility than traditional copper based systems.

Optical transmission facilities are installed in the form of synchronous optical network (SONET) rings. SONET defines a line rate hierarchy and frame format as described by the American National Standards Institute (ANSI) T1.105 and T1.106 specifications. SONET rings are typically bidirectional to provide redundant transmission paths and protection in case of a network failure. Nodes on a SONET ring provide add-drop multiplexing and digital cross connect functionality for traffic on the ring.

The simple network management protocol (SNMP) is heavily used for network management in the data communications industry. SNMP uses User Datagram Protocol (UDP) and Internet Protocol (IP) packets to communicate management information between a management station and a network node, which is not readily transportable on a SONET ring. As a result, SONET nodes cannot be remotely managed using SNMP and other protocol using IP and similar messaging because the network management stations do not have the ability to communicate with nodes beyond an immediately connected node. Thus, the network management station has no knowledge of the existence of any other nodes on the SONET ring outside the immediate node. To communicate with multiple nodes on the SONET ring, additional management network external to the ring must be used which is costly to implement and maintain.

SUMMARY OF THE INVENTION

The present invention provides an improved method and system for providing a broadcast channel over an emulated subnetwork. In particular, Internet Protocol (IP) or other suitable traffic is transmitted in virtual channels of an asynchronous transfer mode (ATM) subnetwork on a synchronous optical network (SONET) ring. Accordingly, simple network management protocol (SNMP) and other suitable types of management and control traffic can be broadcast from and to remote resources on a SONET ring.

In accordance with one embodiment of the present invention, a method and system for communicating traffic on an emulated subnetwork of a telecommunications ring having a plurality of nodes interconnected by a transmission media includes obtaining traffic at a node on the telecommunications ring. The traffic may be generated within the node or received from an external device on a local area or other network. The traffic is segmented into a plurality of discrete segments. A set of broadcast cells is generated by adding an address header to each segment. The address header identifies a virtual channel dedicated to the node for broadcast traffic in the subnetwork on the telecommunications ring. The set of broadcast cells are transmitted in the virtual channel of the subnetwork and within a frame of the telecommunications ring. In response to receiving the set of broadcast cells in the virtual channel, each remaining node on the telecommunications ring both retransmits and processes the broadcast cells.

More specifically, in accordance with a particular embodiment of the present invention, the telecommunications ring is a synchronous optical network (SONET) ring. In this embodiment, the broadcast cells comprise asynchronous transport mode (ATM) cells each including an ATM header identifying the virtual channel. The ATM cells may be formed by segmenting broadcast traffic in the form of an Internet protocol (IP) packet to form AAL5 cells and adding the ATM header to the cells to form the ATM cells.

Technical advantages of the present invention include providing an improved management system and method for a SONET or other suitable type of telecommunications ring. In particular, management, control, and similar types of information are transmitted by each node in an ATM subnetwork on the SONET ring. Each node can act as a gateway to transmit and receive management and control messages between a network management station and a remote management agent connected to another node on the SONET ring. Accordingly, a centralized management station may use simple network management protocol (SNMP) and other conventional and readily available protocols to manage remote nodes. External management networks may be eliminated. This improves manageability of a SONET ring and reduces cost.

Another technical advantage of the present invention includes providing dedicated broadcast channels in a SONET ring. In particular, an ATM virtual channel is assigned to each node in the SONET ring. Each node, in response to receiving traffic in a virtual channel of another node on the ring, both processes and retransmits the traffic. In addition, each virtual channel is bidirectional and thus protected against a network failure.

Still another technical advantage of the present invention includes providing ring frame encapsulation for management messages broadcast on the SONET ring. The ring frame identifies the source node and the destination node of the traffic, as well as the message type. Provision of the ring frame allows each node receiving the message to efficiently process the message and determine whether it is destined for that node and thus in need of further processing. Accordingly, each node can efficiently process broadcast traffic within the SONET ring.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
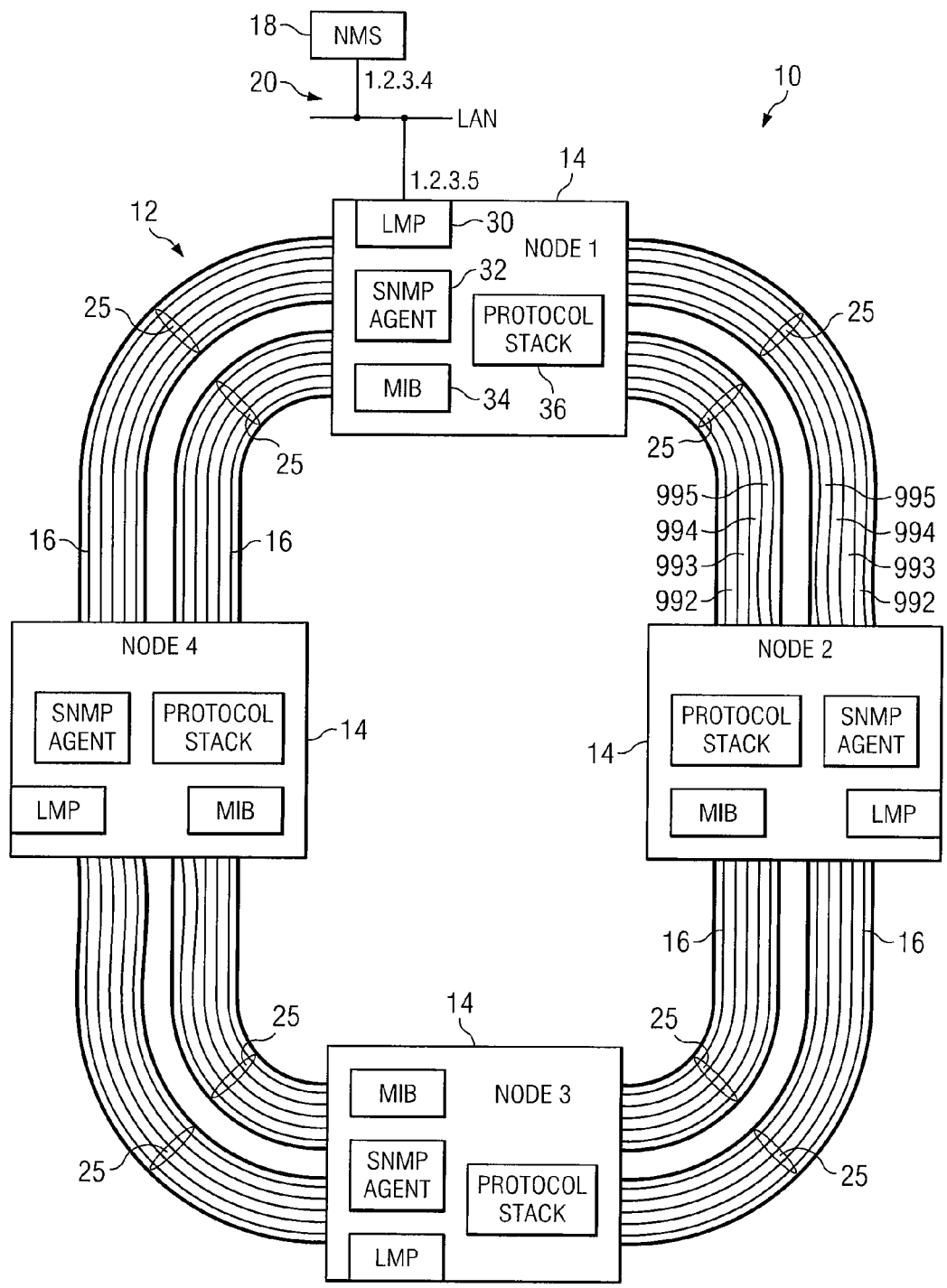
FIG. 1 is a block diagram illustrating a synchronous optical network (SONET) ring of a telecommunications system in accordance with one embodiment of the present invention.

FIG. 1 illustrates a telecommunication system 10 in accordance with an embodiment of the present invention. The telecommunication system 10 transmits voice, video, other suitable types of data, and/or a combination of different types between remote locations. In the embodiment of FIG. 1, as described in more detail below, broadcast channels are provided in an asynchronous transfer mode (ATM) network on a synchronous optical network (SONET) ring. Command, control and other types of suitable messages are transmitted in the broadcast channels on the SONET ring. It will be understood that other types of suitable subnetworks may be emulated on the SONET ring or other suitable type of telecommunications network.

Referring to FIG. 1, the telecommunication system 10 includes a SONET ring 12 having a plurality of nodes 14 interconnected by transmission lines 16. A network management station (NMS) 18 is connected to a node 14 of the SONET ring 12 via a local area network (LAN) 20. The nodes 14 each comprise a network element (NE) capable of communicating traffic in the telecommunication system 10. The network elements comprise switches, routers, add/drop multiplexers and other devices capable of directing traffic in the telecommunication system 10.

The transmission lines 16 provide a physical interface between the nodes 14. Each physical interface is defined by the bandwidth of the connecting transmission line 16. For the SONET ring 12, the transmission lines 14 each comprise optical fiber capable of transporting traffic between two nodes 14. The optical fiber may be an OC-3 line, an OC-12 line, or the like. For protection switching, redundant transmission lines 16 are provided that transmit traffic in opposite directions around the SONET ring 12.

The transmission lines 16 include virtual channels 25 defined in the ATM network on the SONET ring 12. As described in more detail below, a virtual channel 25 is assigned to each node 14 as a broadcast channel. The nodes 14 each transmit control information in their own broadcast channel on both the working and protect links and each discard returning traffic from their virtual channel. Each node 14 receiving traffic in the virtual channel of another node 14 will both process that traffic and retransmit that traffic back on the SONET ring 12 for receipt and processing by other nodes 14. In this way, control traffic is broadcast around the SONET ring 12 and thereafter removed from the ring 12.

For the embodiment of FIG. 1, each node 14 is a multi protocol element including a LAN management port (LMP) 30, a simple network management protocol (SNMP) agent 32, a management information base (MIB) 34, and a protocol stack 36. The LMP 30 provides a connection for a LAN 20 to the node 14. Accordingly, devices such as the NMS 18 can communicate with a local node 14 and use the local node 14 as a gateway to communicate with other nodes 14 on the SONET ring 12.

The SNMP agent 32 and MIB 34 form an SNMP management model that supports a set of hierarchial managed objects which map a set of manageable entities with a specific set of attributes and behavior. These managed objects are accessed by the SNMP agent 32 via the MIB 34. In addition, the SNMP agent 32 performs core SNMP processing, such as parsing SNMP requests, verifying the SNMP community name, calling the MIB interface functions, and creating SNMP responses. Messages destined for remote nodes 14 are passed through the protocol stack 36 for conversion and transmission on the SONET ring 12. Further information concerning the SNMP model for network management is provided at RFC 1157, which defines the SNMP model.

The protocol stack 36 converts traffic between the multiple protocols of the nodes 14. For the embodiment of FIG. 1, the protocol stack 36 includes a UDP layer, an IP layer, ring frame layer, AAL5 layer, ATM layer, and a physical layer. In particular, as described in more detail below, application traffic is received or converted to User Diagram Protocol/Internet Protocol (UDP/IP) traffic which is segmented into small, fixed length ATM cells that are transmitted by the nodes 14 in SONET frames. The ATM cells include address tags for routing in the virtual channels of the ATM network. The address tags each have two sections that define a virtual path interface (VPI) and a virtual channel interface (VCI) in the ATM subnetwork on the SONET ring 12. In a particular embodiment, the broadcast channel is identified by a VCI in the ATM header with the VPI always set to null. It will be understood that the virtual channel may be otherwise identified within the ATM or other suitable header.

For the embodiment of FIG. 1, the SONET ring 12 includes a first node ("Node 1"), a second node ("Node 2"), a third node ("Node 3"), and a fourth node ("Node 4"). The SONET ring 12 is assigned a unique network address 10.20.30.0, with each node 14 being provisioned with a unique node ID of 1-4, respectively. Each node 14 is further assigned a unique IP address consistent with the ring network address. In one embodiment, for example, the IP address is a combination of network address and the node ID. Thus, Node 1 has an IP address of 10.20.30.1, Node 2 has an IP address of 10.20.30.2, Node 3 has an IP address of 10.20.30.3, and Node 4 has an IP address of 10.20.30.4. On the LAN 20, the LMP 30 has an IP address of 1.2.3.5, while the NMS 18 has an IP address of 1.2.3.4. The broadcast channels are assigned VCIs within a dedicated range, in a particular embodiment, of 992 1023. Thus, for example, Node 1 is assigned VCI 992, Node 2 is assigned VCI 993, Node 3 is assigned VCI 994, and Node 4 is assigned VCI 995 as broadcast channels. It will be understood that ring, nodes, broadcast channels, and IP addresses may be otherwise suitably assigned to the elements of the telecommunications system 10.

Figure 2A:
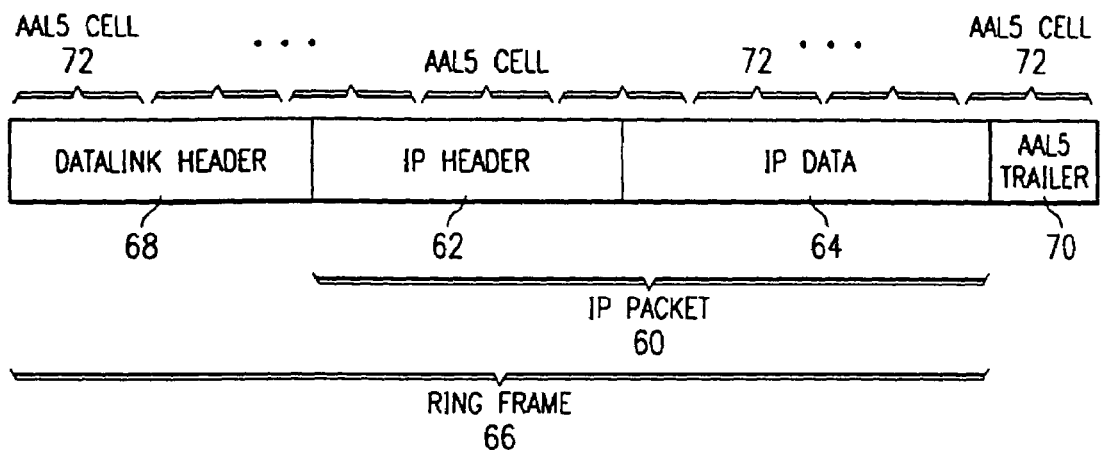
FIG. 2A B are block diagrams illustrating details of traffic at various stages in the protocol stack of FIG. 1.
Figure 2B:
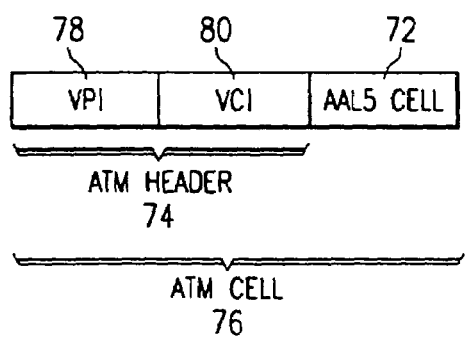

FIG. 2A-B illustrates details of control traffic packaging and encapsulation in the protocols stack 36. In this embodiment, the protocol stack 36 converts and encapsulates IP traffic for transmission as a set of ATM cells in a SONET frame. Control traffic is received as or converted to IP traffic. It will be understood that control traffic may be received in other formats and otherwise suitably converted and encapsulated for transmission in a subnetwork.

Referring to FIG. 2A, an IP packet 60 includes an IP header 62 an IP data 64. The IP header 62 identifies the designation device and the IP data contains a message to be processed by the device. A ring frame 66 is formed by encapsulating the IP packet 60 with a ring frame, datalink, or header 68. The datalink header 68 includes the originating node 14, destination node 14 (or indication of multiple destination nodes), version number packet length, header checksum, control fields, and a packet type. Use of the ring frame 66 improves efficiency within the SONET ring 12 as it allows each node 14 to readily determine whether an encapsulated IP packet 60 is destined for that node 14 without direct processing of the IP packet 60.

The ring frame 66 is further encapsulated by adding AAL5 trailer 70 to the ring frame 66. The encapsulated ring frame 66 is segmented into a set of AAL5 cells 72 in accordance with AAL5 standards. The AAL5 cells 72 each include 48 bytes of data. As used herein, the term each means every one of at least a subset of the identified items.

Referring to FIG. 2B, the AAL5 cells 72 are each encapsulated with an ATM header 74 to form an ATM cell 76. The ATM header 74 includes 5 bytes of overhead identifying a VPI 78 and a VCI 80 for routing the ATM cell 76. As previously discussed, the VCI 80 is used to identify broadcast channels within the ATM subnetwork on the SONET ring 12.

The ATM cells 76 are transmitted on the SONET ring 12 within a SONET frame. Upon receipt by a node 14, the ATM header 74 is stripped from the ATM cells 76 to leave the AAL5 cells 72 which are then reassembled and the AAL5 trailer 70 stripped to regenerate the ring frame 66. Based on information in the datalink header 68 of the ring frame 66, the receiving node 14 either discards the ring frame 66 if it is not destined for that node or further processes the ring frame 66 by stripping the datalink header 68 to regenerate the IP packet 60 if the included message is destined for that node 14. In this way, control messaging is transmitted to remote nodes 14 in an asynchronous network on a synchronous ring.

Figure 3:
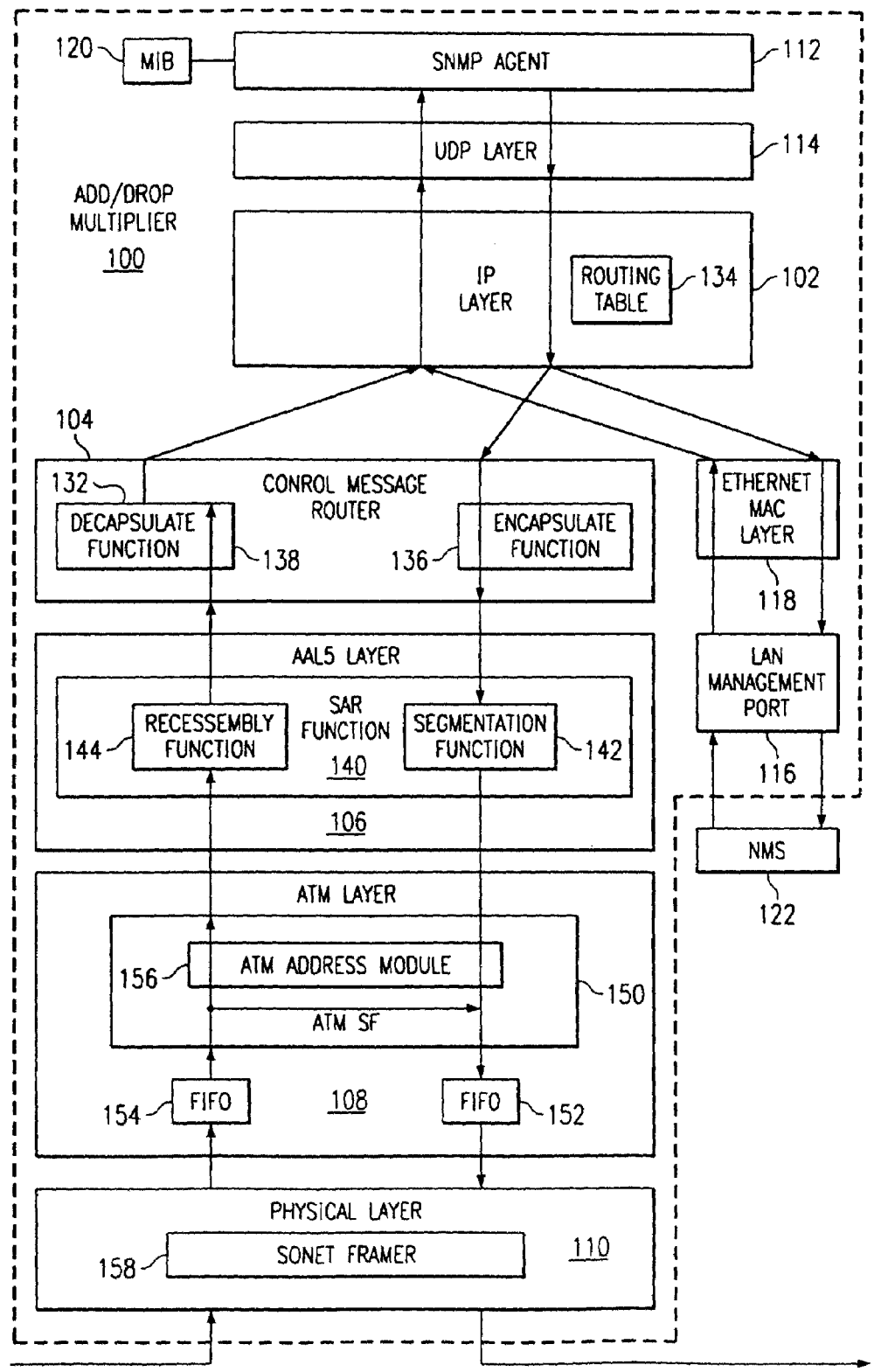
FIG. 3 is a block diagram illustrating details of a network element on the SONET ring of FIG. 1 in accordance with one embodiment of the present invention.

FIG. 3 illustrates details of one of the nodes 14 in accordance with one embodiment of the present invention. In this embodiment, the node 14 is a multi-protocol add/multiplexer 100 including IP, ATM and SONET functionality.

Referring to FIG. 3, the add/drop multiplexer 100 includes an IP layer 102, a control messenger router 104, an AAL5 layer 106, an ATM layer 108, and a physical layer 110. At the IP layer 102, messages are either received from or passed to an SNMP agent 112 through a UDP layer 114 or received from or passed to an LMP 116 through an Ethernet/MAC layer 118. The SNMP agent 112 is connected to a MIB 120 while the LMP 116 is connected over a LAN to an NMS 122.

The IP layer 102 includes an IP engine 130 and a routing table 134. The IP engine receives and encapsulates UDP control traffic from the UDP layer 114 to IP traffic and decapsulates IP traffic destined for the SNMP agent 112 to UDP traffic before passing it to the UDP layer 114. The IP engine 132 receives and converts control traffic from the Ethernet/Mac layer 118 to IP traffic and routes IP traffic destined for the NMS 122 to the Ethernet/Mac layer 118.

The routing table 134 is used to route IP traffic received or converted at the IP layer 102 to the control message router 104, UDP layer 114, or Ethernet/MAC layer 118. The routing table 134 includes route back information for responding to requests. For IP traffic, new route back information is added to the routing table 134 by the control message router 104.

The control message router 104 includes an encapsulation function 136 and a decapsulation function 138. The encapsulation function 136 encapsulates outgoing IP traffic into a ring frame 66. The decapsulation function 138 decapsulates an incoming ring frame 66 by stripping the datalink header 68 from the frame to leave an IP packet 60 for processing by the IP layer 102.

The AAL5 layer 106 includes a segmentation and a reassembly (SAR) function 140. The SAR function 140 includes a segmentation function 142 and a reassembly function 144. The segmentation function 142 segments each outgoing ring frame 66 into a set of AAL5 cells 72 in accordance with AAL5 standards. The reassembly function 144 reassembles each incoming set of AAL5 cells 72 into a ring frame 66 for processing by the control message router 104.

The ATM layer 108 includes ATM switch fabric (SF) 150, an outgoing traffic first-in first-out (FIFO) buffer 152, and an incoming traffic first-in first-out (FIFO) buffer 154. The ATM switch fabric 150 includes an ATM address module 156. The ATM address module 156 encapsulates each outgoing AAL5 cell 72 with an ATM address header 74 for routing on the ATM network of the SONET ring 12, strips ATM address headers 74 from each incoming ATM cell 76 to generate AAL5 cells 72 for processing by the AAL5 layer 106.

The incoming FIFO buffer 152 stores outgoing ATM cells 76 for transmission by the physical layer 110. The incoming FIFO 154 stores traffic received from the physical layer 110 for processing by the ATM switch fabric 150.

The physical layer 110 includes a SONET framer 158 that frames and transmits outgoing traffic from the FIFO buffer 152 onto the SONET ring 12 within available bandwidth. The SONET framer 156 receives and passes incoming ATM traffic to the FIFO buffer 154 for processing by the add/drop multiplexer 100.

Figure 4:
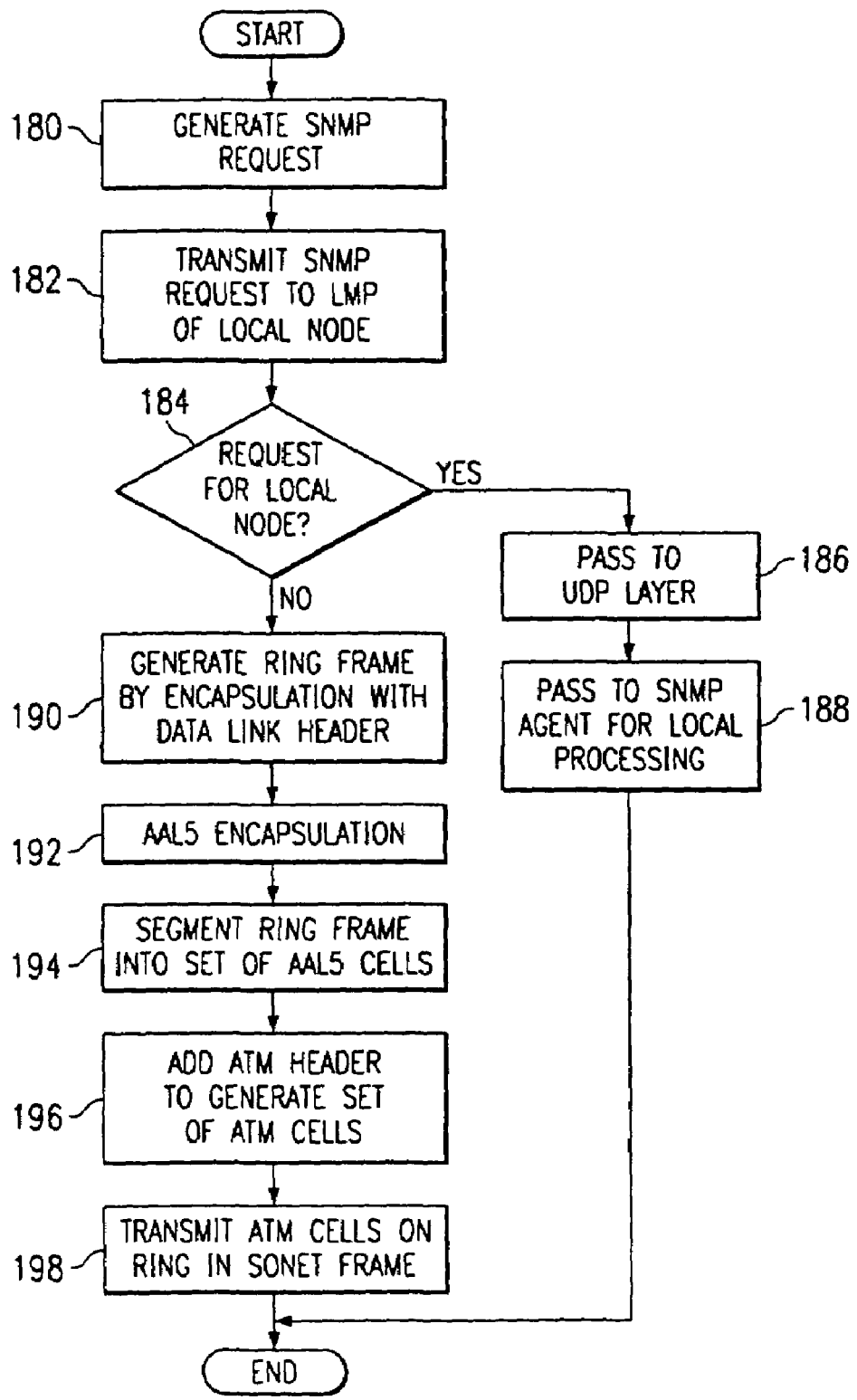
FIG. 4 is a flow diagram illustrating a method for transmitting broadcast traffic on the SONET ring of FIG. 1 in accordance with one embodiment of the present invention.

FIG. 4 is a flow diagram illustrating a method for transmitting broadcast traffic on the SONET ring 12 in accordance with one embodiment of the present invention. In this embodiment, IP traffic is broadcast as ATM cells 76 on the SONET ring 12. In addition, ring frame encapsulation is used to allow each node 14 to easily identify traffic destined for the node 14 and in need of further processing.

Referring to FIG. 4, the method begins at step 180 in which a SNMP control traffic is generated. The SNMP control traffic may be generated by the NMS 122 coupled to add/drop multiplexer 100 by the LAN 20.

Proceeding to step 182, the NMS 122 transmits the SNMP control traffic as a UDP/IP packet over the LAN to the LMP 116 of the add/drop multiplexer 100. From the LMP 116, the TCP packet is passed through the Ethernet/Mac layer 118 to the IP layer 102 where it is converted to an IP packet 60.

Proceeding to decisional step 184, the IP layer 102 determines if the control traffic can be locally processed by the add/drop multiplexer 100. If the control traffic can be processed locally by the add/drop multiplexer 100, the Yes branch of decisional step 184 leads to step 186 in which the control traffic is passed to the UDP layer 114. At step 188, the control traffic is passed to the SNMP agent 112 for local processing and response. Step 188 leads to the end of the process by which SNMP control traffic is locally processed.

Returning to decisional step 184, if the control traffic cannot be locally processed but is destined for a remote node 14, the No branch of decisional step 184 leads to step 190. At step 190, the control traffic is passed to the control message router 104 for ring frame encapsulation. At the control message router 104, the encapsulation function 136 encapsulates the IP packet 60 containing the control traffic with the datalink header 68. As previously described, the ring frame 66 allows each add/drop multiplexer 100 to efficiently determine whether the contained traffic is in need of further processing by that node.

Next, at step 192, the ring frame is encapsulated with an AAL5 trailer 70 by the AAL5 layer 106. At step 194, the segmentation function 142 segments the encapsulated ring frame into a set of AAL5 cells 72. As previously described, each AAL5 cell 72 includes 48 bits of data from the encapsulated ring frame.

Next, at step 196, the ATM layer 108 adds an ATM header 74 to each AAL5 cell 72 to generate a set of ATM cells 76. The ATM header 74 for each cell 76 identifies the broadcast channel for the add/drop multiplexer 100. The ATM cells 76 are stored in the outgoing FIFO buffer 152 for transmission by the physical layer 110.

Proceeding to step 198, the SONET framer 158 in the physical layer 110 frames and transmits the ATM cells 76 on the SONET ring 12. Within the SONET ring 12, the ATM cells 76 are transmitted within the broadcast channel identified by the ATM header 74. Step 198 leads to the end of the process by which the add/drop multiplexer 100 acts as a gateway to encapsulated and transmitted SNMP control traffic on the SONET frame 12 for processing and response by a remote node 14.

Figure 5:
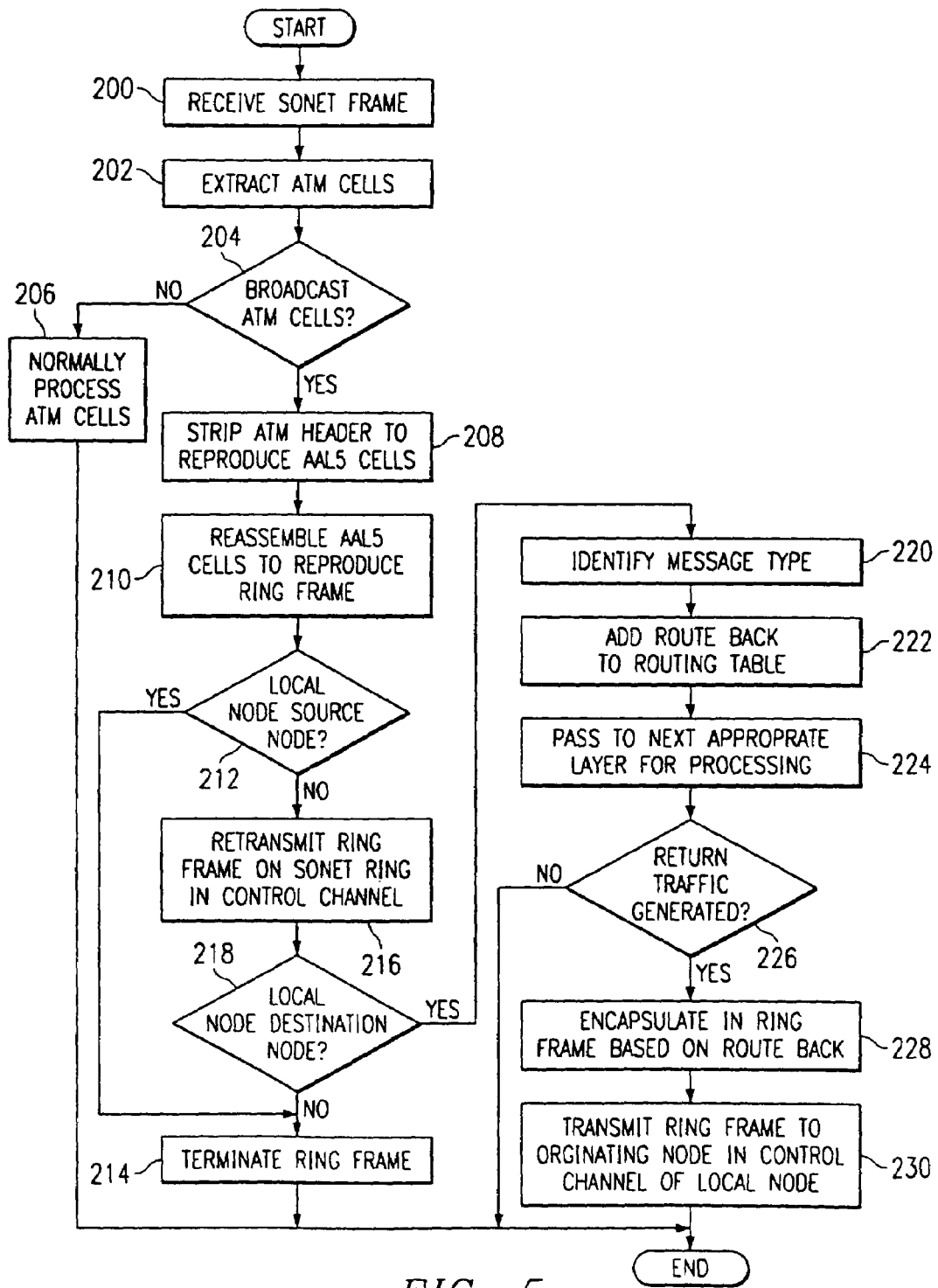
FIG. 5 is a flow diagram illustrating a method for processing traffic received from the SONET ring of FIG. 1 in accordance with one embodiment of the present invention.

FIG. 5 illustrates a method for processing traffic received on the SONET ring 12 in the add/drop multiplexer 100 in accordance with one embodiment of the present invention. In this embodiment, control traffic is broadcast as an IP packet 60 segmented into a set of ATM cells 76 identifying broadcast channels on the SONET ring 12.

Referring to FIG. 5, the method begins at step 200 in which the add/drop multiplexer 100 receives a SONET frame. Next, at step 202, the SONET framer 156 extracts ATM cells 76 within the frame and passes them in the incoming FIFO buffer 154.

Proceeding to decisional step 204, the ATM layer 108 determines whether the ATM cells 76 were received in a broadcast channel of the ATM network and are therefor to be both processed and retransmitted. If the ATM cells 76 are not broadcast cells, the No branch of decisional step 204 leads to step 206 in which the ATM cells 76 are normally processed. Step 206 leads to the end of the process. If the ATM cells 76 are broadcast cells, the Yes branch of decisional step 204 leads to step 208 in which the ATM layer 108 strips ATM header 74 from each cell to reproduce the set of AAL5 cells 72.

Next, at step 210, the AAL5 layer 106 reassembles the AAL5 cells 72 to reproduce the ring frame 66. As previously described, the ring frame 66 allows the add/drop multiplexer 100 to efficiently determine whether further processing of the frame 66 is required.

Proceeding to decisional step 212, the control message router 104 determines whether the add/drop multiplexer 100 was the originating node 14 that placed the ring frame 66 on the SONET ring 12. If the add/drop multiplexer 100 is the source node 14, then the message has been broadcast completely around the SONET ring 12 and should be removed from the ring 12. Accordingly, the Yes branch of decisional step 212 leads to step 214 in which the ring frame 66 is terminated. If the add/drop multiplexer 100 is not the source node 14, the No branch of decisional step leads to step 216 in which the ring frame 66 is retransmitted on the SONET ring 12 as previously described in connection with FIG. 4.

Next, at decisional step 218, the control message router 104 determines whether the add/drop multiplexer 100 is a destination node for the ring frame 66. If the add/drop multiplexer 100 is not a destination node, no further processing of the ring frame 66 is required and the No branch of decisional step 218 leads to step 214 where the ring frame 66 is terminated after having already been retransmitted on the SONET ring 12. If the add/drop multiplexer 100 is the destination node, the Yes branch of decisional step 218 leads to step 220. At step 220, the control message router 104 extracts the IP packet 60 from the ring frame 66 using the decapsulation function 138 and passes the IP packet 60 to the IP layer 102 for routing. At step 220 the control message router 104 adds a route-back for the control traffic in the IP packet 60 to the routing table 134 in the IP layer 102.

Proceeding to step 224, the IP layer 102 converts the IP packet 60 as necessary and passes the control traffic to the next appropriate layer for processing. If the control traffic is destined for the SNMP agent 112, the IP layer 102 passes the control traffic to the UDP layer 114 for processing. If the control traffic is destined for the NMS 122, the IP layer 122 will pass the control traffic to the Ethernet/MAC layer 118.

Proceeding to decisional step 226, if return traffic is not generated by the control traffic, the No branch of decisional step 226 leads to the end of the process by which a remotely originated control traffic is received and processed to control the add/drop multiplexer 100. If return traffic is generated, the Yes branch of decisional step 226 leads to step 228 in which a response or other return traffic is encapsulated in a ring frame 66 based on the route-back in the routing table 134. Next, at step 230, the ring frame 66 is transmitted to the originating node 66 in the broadcast channel of the add/drop multiplexer 100 as previously described with FIG. 5. Step 230 leads the end of the process in which the add/drop multiplexer 100 provides control information to remote devices.

Although the present invention has been described with several embodiments, various changes and modifications may be suggested to one skilled in the art. It is intended that the present invention encompass such changes and modifications as fall within the scope of the appended claims.

What is claimed is:

1. A method for broadcasting traffic in a synchronous optical network (SONET) ring having a plurality of nodes interconnected by an optical transmission media, comprising:

assigning each node on the SONET ring a distinct virtual channel on a subnetwork in the SONET ring;

transmitting broadcast traffic at each node within a frame of the SONET ring in the virtual channel assigned to the node; and processing and retransmitting at each node traffic received on the SONET ring in a virtual channel assigned to another node.

2. The method of claim 1, further comprising assigning each node on the SONET ring a virtual channel in an asynchronous transfer mode (ATM) network.

3. The method of claim 1, further comprising removing at each node traffic received on the SONET ring in the virtual channel assigned to the node.

4. The method of claim 1, further comprising:

converting broadcast traffic into a set of asynchronous transfer mode (ATM) cells identifying the virtual channel assigned to the node; and transporting the ATM cells in the virtual channel within a frame of the telecommunications ring.

5. The method of claim 1 wherein transmitting broadcast traffic comprises transmitting a SONET frame, the SONET frame comprising a plurality of asynchronous transport mode (ATM) cells within the SONET frame; and each ATM cell comprising a portion of a message transmitted initially onto the SONET ring by a node and an ATM header identifying an ATM virtual channel uniquely assigned to the node within the SONET ring.

6. The method of claim 5, each of the plurality of ATM cells further comprising a portion of an Internet Protocol (IP) packet comprising the message.

7. A telecommunications ring, comprising:
a plurality of nodes;
a transmission media interconnecting the nodes in a telecommunications ring;
a distinct virtual channel assigned to each node on a subnetwork in the telecommunications ring; and
each node, in response to receiving traffic in a virtual channel assigned to another node, operable to both process and retransmit the traffic.

8. The telecommunications ring of claim 7, further comprising each node, in response to receiving traffic in the virtual channel assigned to the node, operable to remove the traffic from the telecommunications ring.

9. The telecommunications ring of claim 7, each node further comprising a protocol stack operable to convert broadcast traffic into a set of asynchronous transfer mode (ATM) cells identifying the virtual channel assigned to the node and to transport the ATM cells in the virtual channel within a frame of the telecommunications ring.

10. The telecommunications ring of claim 9, wherein the transmission media is an optical transmission media and the frame is a synchronous optical network (SONET) frame.

11. A system for communicating traffic on an emulated subnetwork of a telecommunications ring having a plurality of nodes interconnected by a transmission media, at least one of the plurality of nodes operable to:
receive traffic on the telecommunications ring;
segment the traffic into a plurality of discrete segments;
generate a set of broadcast cells by adding an address header to each segment, the address header identifying a virtual channel dedicated to the node on a subnetwork in the telecommunications ring;
transmit the set of broadcast cells in the virtual channel of the subnetwork within a frame of the telecommunications ring;
receive from each of a plurality of remaining nodes on the telecommunications ring the set of broadcast cells in the virtual channel; and
retransmitting and process the set of broadcast cells.

12. The system of claim 11, wherein the transmission media is optical fiber and the telecommunications ring is a synchronous optical network (SONET) ring.

13. The system of claim 11, wherein the at least one of the plurality of nodes is further operable to generate a set of asynchronous transport mode (ATM) broadcast cells by adding an ATM header to each segment, the ATM header identifying the virtual channel dedicated to the at least one of the plurality of nodes on the subnetwork.

14. The system of claim 13, wherein the at least one of the plurality of nodes is further operable to segment the traffic into a plurality of discrete AAL5 cells.

15. The system of claim 11, wherein the at least one of the plurality of nodes is further operable to:
prior to segmenting the traffic, encapsulate the traffic in a ring frame by adding a ring layer header to the traffic, the ring layer header identifying the at least one of the plurality of nodes, a destination node on the telecommunications ring, and a type of the traffic; and
segment the ring frame into the plurality of segments.

16. The system of claim 11, wherein the traffic is Internet Protocol (IP) traffic.

17. The system of claim 11, wherein the at least one of the plurality of nodes is further operable to remove at the at least one of the plurality of nodes traffic received on the telecommunications ring in the virtual channel dedicated to the at least one of the plurality of nodes.

* * * * *